(12) United States Patent
Grefe

(10) Patent No.: US 9,052,128 B2
(45) Date of Patent: Jun. 9, 2015

(54) VEHICLE WITH A COOLING SYSTEM FOR COOLING AND METHOD FOR COOLING IN A VEHICLE

(71) Applicant: Airbus Operations GmbH, Hamburg (DE)

(72) Inventor: Marco Grefe, Bad Salzuflen (DE)

(73) Assignee: Airbus Operations GmbH (DE)

( * ) Notice: Subject to any disclaimer, the term of this patent is extended or adjusted under 35 U.S.C. 154(b) by 187 days.

(21) Appl. No.: 13/677,804

(22) Filed: Nov. 15, 2012

(65) Prior Publication Data

US 2013/0125566 A1 May 23, 2013

Related U.S. Application Data

(60) Provisional application No. 61/561,348, filed on Nov. 18, 2011.

(30) Foreign Application Priority Data

Nov. 18, 2011 (DE) .......................... 10 2011 118 873

(51) Int. Cl.
*F25B 7/00* (2006.01)
*F25B 27/02* (2006.01)
(Continued)

(52) U.S. Cl.
CPC ................ *F25B 27/02* (2013.01); *B64D 13/08* (2013.01); *F25B 15/04* (2013.01); *F25B 25/02* (2013.01);
(Continued)

(58) Field of Classification Search
CPC .................. B64D 37/37; B64D 13/08; B64D 2013/0644; B64D 2041/005; B64D 2013/0674; B64D 37/34; F25B 27/02; F25B 15/04; F25B 25/02; Y02E 60/50; Y02T 50/56; Y02T 90/36

USPC .......... 62/79, 112, 238.3, 476, 434, 479, 483, 62/489
See application file for complete search history.

(56) References Cited

U.S. PATENT DOCUMENTS

| 4,031,712 | A | * | 6/1977 | Costello ......................... 62/483 |
| 4,222,244 | A | * | 9/1980 | Meckler ...................... 62/235.1 |
| 4,337,625 | A | * | 7/1982 | Wilkinson ........................ 62/79 |
| 4,373,347 | A | * | 2/1983 | Howell et al. ................... 62/112 |
| 4,441,332 | A | * | 4/1984 | Wilkinson ................... 62/238.3 |

(Continued)

FOREIGN PATENT DOCUMENTS

| DE | 69520630 T2 | 10/2001 |
| DE | 102009018401 A1 | 10/2010 |

OTHER PUBLICATIONS

Dr.-Ing J.H. Dannies, Die Absorptionskältemaschine, 1951.

*Primary Examiner* — Mohammad M Ali
(74) *Attorney, Agent, or Firm* — Lerner, David, Littenberg, Krumholz & Mentlik, LLP

(57) ABSTRACT

A cooling system of a vehicle with a fuel cell includes an absorbent circuit with an absorber tank, a regenerator tank, an absorbent pump and a first pressure reduction means and a coolant circuit with a condenser connected to a steam outlet of the regenerator tank, a second pressure reduction means and an evaporator arranged between a steam inlet of the absorber tank and the second pressure reduction means. The regenerator tank is designed to desorb the coolant in solution in the absorbent by absorbing a first quantity of heat and to introduce it in a vaporous state into the condenser. The evaporator is designed to evaporate the coolant while absorbing a second quantity of heat and to introduce it in the vaporous state into the absorber tank. At least one of the first and of the second quantity of heat could be provided by the fuel cell.

14 Claims, 6 Drawing Sheets

(51) Int. Cl.
  *B64D 13/08* (2006.01)
  *B64D 37/34* (2006.01)
  *H01M 8/04* (2006.01)
  *F25B 15/04* (2006.01)
  *F25B 25/02* (2006.01)
  *B64D 41/00* (2006.01)
  *B64D 13/06* (2006.01)

(52) U.S. Cl.
  CPC .......... *B64D 37/34* (2013.01); *B64D 2041/005* (2013.01); *B64D 2013/0644* (2013.01); *B64D 2013/0674* (2013.01); *Y02T 90/36* (2013.01); *Y02T 50/56* (2013.01); *H01M 8/04029* (2013.01); *H01M 8/04059* (2013.01); *H01M 8/04074* (2013.01); *Y02E 60/50* (2013.01)

(56) References Cited

U.S. PATENT DOCUMENTS

| | | | | |
|---|---|---|---|---|
| 4,672,821 | A * | 6/1987 | Furutera et al. | 62/324.2 |
| 4,902,207 | A * | 2/1990 | Hembree et al. | 417/403 |
| 5,537,837 | A * | 7/1996 | Hsieh | 62/238.3 |
| 5,617,738 | A * | 4/1997 | Ikegami et al. | 62/509 |
| 6,128,917 | A * | 10/2000 | Riesch et al. | 62/476 |
| 6,313,393 | B1 * | 11/2001 | Drost | 136/201 |
| 6,318,106 | B1 * | 11/2001 | Maeda | 62/271 |
| 6,470,702 | B2 * | 10/2002 | Funaba et al. | 62/497 |
| 2001/0013226 | A1* | 8/2001 | Potnis et al. | 62/271 |
| 2001/0015077 | A1* | 8/2001 | Potnis et al. | 62/497 |
| 2003/0019229 | A1* | 1/2003 | Dodo et al. | 62/238.3 |
| 2003/0051496 | A1* | 3/2003 | Fukushima et al. | 62/238.3 |
| 2003/0167790 | A1* | 9/2003 | Koike et al. | 62/476 |
| 2004/0086759 | A1* | 5/2004 | Parchamazad | 429/26 |
| 2011/0005253 | A1* | 1/2011 | Kayanuma et al. | 62/238.3 |

* cited by examiner

# VEHICLE WITH A COOLING SYSTEM FOR COOLING AND METHOD FOR COOLING IN A VEHICLE

CROSS-REFERENCE TO RELATED APPLICATIONS

This application claims the benefit of the filing date of U.S. Provisional Patent Application No. 61/561,348, filed Nov. 18, 2011, the disclosure of which is hereby incorporated herein by reference.

TECHNICAL FIELD

The invention relates to a vehicle with a cooling system and to a method for cooling in a vehicle.

BACKGROUND OF THE INVENTION

In vehicles and in particular in a commercial aircraft a host of cooling tasks are to be performed by cooling systems. Apart from cooling large quantities of air for cabin air conditioning, other heat-generating devices are also to be cooled, which devices relate, in particular, to electrical and electronic apparatus. Commonly-used air conditioning systems of a commercial aircraft are based on cooling units that implement an air circuit method (Joule-Thomson method) and/or an evaporator circuit method (Clausius-Rankine method). These circuits require the operation of compressors that are supplied either electrically or by way of bleed air, for example from aircraft engines, with the capacity necessary for operation. However, this may have a negative effect on the fuel consumption of the vehicle.

DE 199 36 641 A1 shows a device for air conditioning a cabin region of a passenger aircraft by means of externally supplied fresh air and bleed air from an engine.

BRIEF SUMMARY OF THE INVENTION

Correspondingly, An aspect of the invention proposes a vehicle with a cooling system for cooling heat-emitting devices, and a method for cooling heat-generating devices in a vehicle, in which a reduction in the fuel consumption of the vehicle is made possible.

The cooling system of the vehicle comprises an absorbent circuit in which a liquid absorbent circulates. The absorbent circuit comprises an absorber tank, a regenerator tank, an absorbent pump and a first pressure reduction means. By means of an absorber tank outlet the absorber tank is connected, by way of the absorbent pump, to a regenerator tank inlet. By way of the first pressure reduction means a regenerator tank outlet is connected to an absorber tank inlet. In addition, the cooling system comprises a coolant circuit in which a coolant is circulated. The coolant circuit comprises a condenser that is connected to a steam outlet of the regenerator tank, a second pressure reduction means, and an evaporator, wherein the evaporator is connected to a steam inlet of the absorber tank and by way of the second pressure reduction means is connected to the condenser. The regenerator tank is designed to desorb the coolant in solution in the absorbent by absorbing a first quantity of heat and to introduce it in a vaporous state into the condenser. The evaporator is designed to evaporate the coolant by absorbing a second quantity of heat and to introduce it in a vaporous state into the absorber tank. At least one of the first quantity and of the second quantity of heat is emittable by a heat-emitting device of the vehicle.

This cooling system is based on a Clausius-Rankine method that is operatable without a mechanical compressor. Only an absorbent pump is provided as a power consuming component, which absorbent pump is preferably operated by way of an electric motor. All the other components are operated by the first quantity of heat and the second quantity of heat. The function of the cooling system according to an embodiment of the invention is explained below.

The absorber tank comprises a liquid absorbent that is designed to absorb a coolant. By way of a vapor inlet the coolant as the absorbate is fed in a vaporous state into the absorber tank and in this process forms a solution with the liquid absorbent present therein. In theory this process may be carried out until saturation of the absorbent has occurred. In order to prevent this, the liquid absorbent with the coolant in solution therein is always fed into the regenerator tank by way of the absorbent pump, and is replaced by a largely pure absorbent.

During conveyance of the absorbent the pressure of the absorbent increases towards the regenerator tank so that a higher level of pressure exists therein than in the absorber tank. Below, the totality of the components of the cooling system, which components are subjected to this higher pressure, are referred to as the high-pressure side, while the remaining components form part of a low-pressure side.

By introducing the first quantity of heat into the regenerator tank, by desorption the coolant is dissolved from the liquid absorbent and may exit at the steam outlet of the regenerator tank. Preferably, the boiling point of the coolant is sufficiently low for it to be soluble from the absorbent without any problems as a result of thermal input.

On the high-pressure side the vaporous coolant flows to the condenser where it emits its heat as a result of condensation. This heat emission may preferably take place to the environment of the cooling system or of the vehicle itself, or it may also be used for other heat-consuming devices. The now liquid coolant is conveyed, by way of the second pressure reduction means, to the low-pressure side into the evaporator where under the influence of the second quantity of heat it evaporates again and is fed into the steam inlet of the absorber tank.

The vehicle and the cooling system constructed therein provide a particular advantage in that heat or waste heat of devices that are already present in the vehicle is used in order to provide a cooling capacity for cooling tasks. The cooling capacity may, for example, support, or entirely perform, the cooling of air for a cabin air conditioning system, and consequently the primary energy requirement for cooling tasks is largely, or entirely covered without the use of bleed air.

In an advantageous embodiment of the invention, the absorbent has been implemented in the form of water, while the coolant is preferably a liquid coolant with a boiling point clearly below the boiling point of water. Because of its non-combustible characteristics, water is eminently suitable for use in a vehicle, and may furthermore also dissolve a multitude of coolants. For example ammonia or an ammoniacal solution may be considered as a coolant for the aforesaid.

In an advantageous embodiment the first quantity of heat and the second quantity of heat are provided separately of each other by a first heat source and a second heat source. In this manner it is possible, in particular in the case of always present waste heat from a device in the vehicle, which waste heat has to be dissipated anyway, at the same time to provide refrigeration capacity for cooling tasks.

In an advantageous embodiment the first quantity of heat and the second quantity of heat are provided jointly by a first heat source or a second heat source. In this manner it is possible for the cooling system to also exclusively provide high cooling capacity for cooling a single device.

The first heat source and the second heat source need not necessarily be implemented by means of vehicle-fixed devices, instead they may also be arranged outside the vehicle, which devices can provide a quantity of heat, for example by solar irradiation or the like. The regenerator tank and the evaporator merely need to be designed to be able to absorb a quantity of heat, for example by means of thermal coupling of the regenerator tank or of the evaporator to a first or second heat source or to a heat-absorbing or heat-conducting device.

Providing the first or the second quantity of heat by means of a fuel cell results in at least the regenerator and/or the evaporator being subjected to a fairly continuous thermal output. In a modern commercial aircraft such a fuel cell may already be provided which during operation generates electrical power on a continuous basis, which electrical power is always accompanied by a dependent waste heat output. By using the waste heat output of the fuel cell on the regenerator, a continuous heat sink on the evaporator may be provided. At that location a refrigeration capacity or the ability to absorb a thermal output is available that is between 0.4 times and 0.9 times the waste heat output of the fuel cell.

An advantageous embodiment of the vehicle comprises an air conditioning system with an air cooling device, wherein the first quantity of heat or the second quantity of heat is realized by a heat-emitting device of the air cooling device of the air conditioning system. Cooling may thus be realized so as to be largely or entirely free of any bleed air, and furthermore it does not require a compressor for an evaporator circuit. Providing the necessary cooling capacity may be implemented by waste heat which, for example in particular in the efficient generation of electrical power by means of a fuel cell, arises anyhow.

It is understood that a vehicle comprises further heat-emitting or waste-heat-emitting devices that are suitable for use as a first or a second heat source or for emitting the first or the second quantity of heat. For example in a modern commercial aircraft a number of electronic devices are used which on the one hand can carry out technical control tasks, while on the other hand also being responsible for on-board entertainment. Such devices are designed in the form of calculating units that during operation always emit a considerable quantity of heat that may also be transmitted to the evaporator.

An advantageous embodiment comprises a first intermediate cooler that is arranged between the regenerator tank outlet and the absorber tank inlet and that is designed to cool the absorbent flowing out of the regenerator tank by heat emission to the absorbent flowing from the absorber tank to the regenerator tank. In this way preheating for facilitated desorption of the coolant is achieved so that a reduced thermal output is required by the first heat source, or the first quantity of heat may be smaller.

An advantageous embodiment further comprises a second intermediate cooler that is arranged between the condenser and the second pressure reduction means and is designed to cool the coolant flowing out of the condenser by heat emission to the coolant flowing from the evaporator into the absorber tank. In this manner it is possible to reduce the vaporous component of the coolant already upstream of any second pressure reduction means or prior to entry into the evaporator. This may be advantageous in particular when the line length between the condenser and the evaporator is relatively long in order to largely prevent a two-phase flow.

A furthermore advantageous embodiment further comprises a compressor that is in fluidic connection with an evaporator outlet and a condenser inlet. The compressor as an optimally operable component is designed to bring the coolant present in vaporous form to a higher pressure level so that additional cooling capacity is provided. In particular in the case of commercial aircraft, some of which may be subjected to extreme climatic conditions when on the ground, it is sensible for the very rarely occurring extremes to only generate as required an additional cooling capacity that may be achieved by means of the compressor. The cooling system may therefore be designed in such a manner that adequate cooling capacity can be provided for normal cooling without having to resort to the compressor. Preferably, the compressor is operated by way of an electric motor so that no bleed air lines, turbines or the like are necessary to drive said compressor.

In an advantageous embodiment of the cooling system a first control valve is arranged between the steam outlet of the regenerator tank and the condenser inlet. As a result of this, controlling the cooling system may take place in the high-pressure train. If the use of an additional compressor is desired, the first control valve may be used to prevent the inflow of the coolant into the regenerator tank by way of the steam outlet.

In an equally advantageous embodiment for the same reasons a second control valve is arranged between the evaporator outlet and the steam inlet of the absorber tank. Preferably a combined use of the first control valve and the second control valve takes place.

If the first thermal output of a first heat source or the first quantity of heat that results in desorption of the coolant from the absorbent is insufficient, in an advantageous embodiment a supplementary heater may be arranged in the regenerator tank. If required the supplementary heater may then be used to support the desorption process.

In an advantageous embodiment the supplementary heater is an electrical heating device. This is very easy to operate and may be implemented in an economical manner. Switching it on and off as required may be implemented without any problems by power electronics.

In an advantageous embodiment the supplementary heater is a combustion heating device which, for example in a vehicle or aircraft, is operated with fuel and can release very considerable heat in a relatively small space.

The method for cooling in a vehicle comprises the steps of absorbing a vaporous coolant by means of a liquid absorbent while emitting heat; desorbing a vaporous coolant from the absorbent while absorbing a first quantity of heat; condensing the vaporous coolant while emitting heat; throttling the flow of liquid coolant; and subsequently evaporating the liquid coolant while absorbing a second quantity of heat. At least one of the first quantity of heat and of the second quantity of heat is provided by a waste-heat-emitting device in the vehicle.

The advantages achieved as a result of the aforesaid correspond to the advantages discussed above; in particular no bleed air source is required, and the electrical power to be produced in particular for conveying liquid absorbent from an absorber tank to a regenerator tank is almost negligible when compared to the thermal output that may be dissipated. The requirement for electrical power is significantly reduced, including when compared to an electrically operated Clausius-Rankine process, because the main drive output is thermally supplied.

In an advantageous embodiment the absorbent flow flowing from a regenerator tank to the absorber tank is cooled by heat emission by way of a first intermediate cooler to the absorbent flow from the absorber tank to the regenerator tank.

In an equally advantageous embodiment the liquid coolant flow flowing from a condenser to the evaporator is cooled by heat emission by way of a second intermediate cooler to the coolant flow flowing from the evaporator to the absorber tank.

It should be pointed out that the function of the cooling system in the vehicle by reversing the process may also consist of providing heat. With the use of the additional compressor the coolant circuit may operate according to the principle of a heat pump so that it becomes possible to more quickly heat the vehicle, for example in an extremely cold environment, in cooperation with a fuel cell or other devices that continuously emit waste heat. To this effect it is ideal to provide several switchover valves in order to reverse the direction of flow from the compressor to the downstream components of the cooling system. The compressor, for example at its outlet, may comprise a first switchover valve and at its inlet a second switchover valve, wherein between the compressor and the condenser a third switching valve is provided and between the evaporator and the compressor a fourth switching valve. This arrangement of switching valves is preferably interconnected in such a manner that the compressor conveys coolant exclusively to the evaporator, which coolant from that location flows back to the compressor exclusively by way of the condenser. In the course of flowing to the condenser the coolant passes through the second pressure reduction means and is consequently relaxed.

BRIEF DESCRIPTION OF THE DRAWINGS

Further characteristics, advantages and application options of the embodiments of the invention are disclosed in the following description of the exemplary embodiments and of the figures. All the described and/or illustrated characteristics per se and in any combination form the subject of the invention, even irrespective of their composition in the individual claims and their interrelationships. Furthermore, identical or similar components in the figures have the same reference characters.

DETAILED DESCRIPTION

Figure 1:
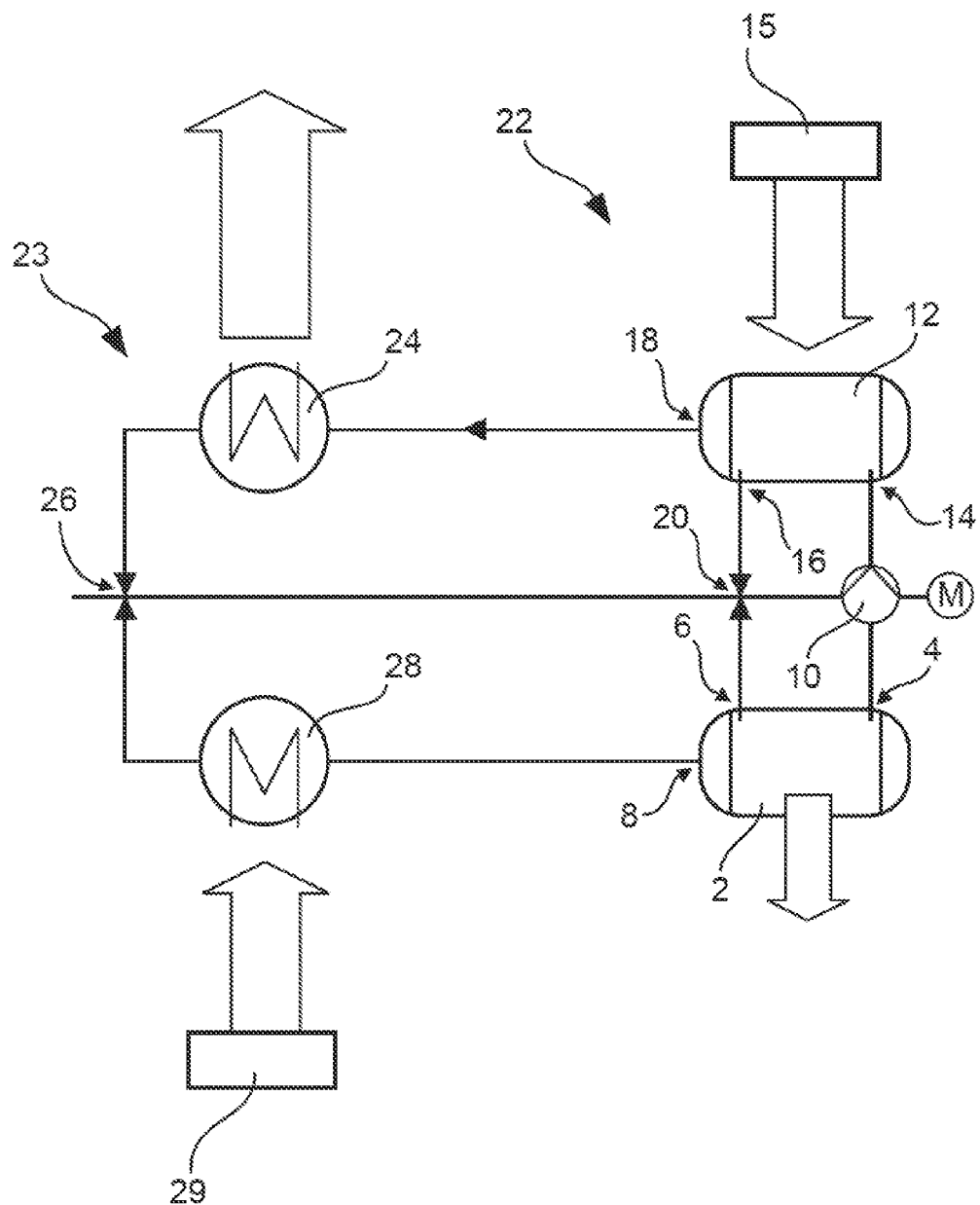
FIG. 1 shows a diagrammatic view of a cooling system of a first exemplary embodiment.

FIG. 1 shows a diagrammatic design of a cooling system in a vehicle in a simple embodiment. An absorber tank 2 comprises a liquid absorbent that may be implemented, for example, in the form of water. The absorber tank 2 comprises an absorber tank outlet 4 and an absorber tank inlet 6 as well as a steam inlet 8. From the absorber tank outlet 4 absorbent may be removed and conveyed to a regenerator tank 12 by way of an absorbent pump 10. The regenerator tank 12 comprises a regenerator tank inlet 14 and a regenerator tank outlet 16, as well as a steam outlet 18. By way of a first pressure reduction means 20, which is, for example, designed as a throttle valve, absorbent from the regenerator tank 12 may flow back to the absorber tank 2. Correspondingly, an absorbent circuit 22 is formed between the absorber tank 2 and the regenerator tank 12, which absorbent circuit 22 may also be referred to as a thermal compressor.

By way of its steam inlet 8 the absorber tank 2 is subjected to a vaporous coolant that may, for example, be in the form of ammonia or of an ammoniacal solution. Such a coolant may very easily be absorbed by water or some similar absorbent. A steady flow of gaseous coolant into the absorbent may only result in absorption until the saturation limit has been reached. During absorption of the coolant, waste heat is generated that is to be removed from the absorber tank 2, for example by way of a flat cooling body or some other devices. Optionally it is imaginable to use this waste heat for other technical devices on the vehicle. If the vehicle is, for example, an aircraft, heat-consuming devices, for example anti-icing systems, may be subjected to waste heat during flight.

In order to forestall saturation of the absorbent, absorbent is conveyed, preferably continuously, from the absorber tank outlet 4 by way of the absorbent pump 10 into the regenerator tank 12 by way of the regenerator tank inlet 14 where under the influence of a first heat source 15 for providing a first quantity of heat, which first heat source 15 is for example designed as a fuel cell or some other heat-emitting or waste-heat-emitting device, the coolant is desorbed from the absorbent and is removed from the regenerator tank 12 by way of the steam outlet 18. By way of the regenerator tank outlet 16 by way of the first pressure reduction means 20 the absorbent that has been freed of coolant in this manner is returned to the absorber tank inlet 6.

As a result of conveyance by way of the absorbent pump 10 the pressure in the regenerator tank 12 is higher than that in the absorber tank 2. In addition it is noticeable that as a result of the dissolution of the gaseous coolant an additional reduction in pressure occurs in the absorber tank 2. Thus, by way of the first pressure reduction means 20 equalization from the high-pressure side to the low-pressure side of the absorbent circuit 22 can take place.

The vaporous coolant emanating from the steam outlet 18 of the regenerator tank 12 is fed to a condenser 24 so that condensation of the coolant occurs while heat is emitted. By way of a second pressure reduction means 26 the pressure of the coolant is lowered so that said coolant has a relatively low temperature and a preferably completely liquid aggregate state. Thereafter said coolant flows into an evaporator 28 that is designed to carry out evaporation of the coolant while absorbing heat from a second heat source 29, i.e. a second quantity of heat.

The second heat source 29 for providing the second quantity of heat may be provided in the form of waste heat of an electrical device to be cooled, or in the form of heat of air that is to be cooled by way of an air cooling device. With a suitable design of the cooling system the heat sink in the form of the evaporator 28 is capable of removing 0.4 times to 0.9 times the heat of the fuel cell as heat, which heat is provided by the first heat source 15. Thus a very efficient cooling system is implemented which may utilize the advantages of the continuous waste heat output of a fuel cell, which waste heat output is present anyway, in order to provide additional refrigeration capacity at some other location. Thus any waste-heat-emitting devices or apparatus within the vehicle may be used to generate cooling capacity. There is no requirement to provide primary energy in the form of bleed air or the like. The electrical power for operating the absorbent pump 10 is negligible when compared to the achievable cooling capacity; the former accounts, for example, for only 2-3% of the thermal output introduced by the first heat source 15.

Figure 2:
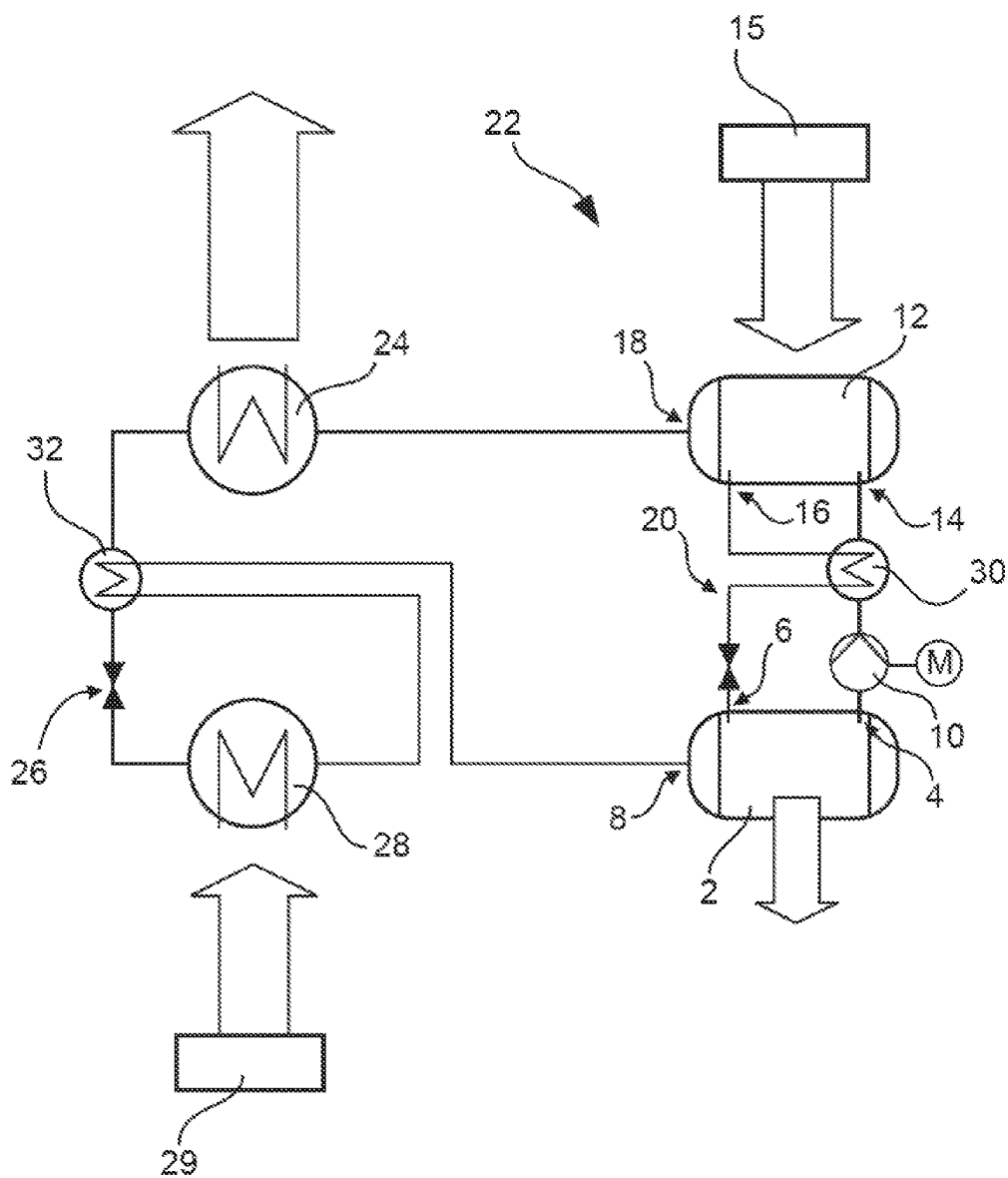
FIG. 2 shows a diagrammatic view of a cooling system of a second exemplary embodiment with intermediate coolers.

FIG. 2 shows a slight modification of the cooling system of FIG. 1. In addition to the elements explained above there is a first intermediate cooler 30 that is arranged between the regenerator tank outlet 16 and the absorber tank outlet 6 and that is designed to cool an absorbent flow from the regenerator tank 12 to the absorber tank 2 while emitting heat to an absorbent flow from the absorber tank 2 to the regenerator tank 12. The preheated mixture comprising absorbent and coolant thus requires less thermal output in order to desorb the coolant, or if the heat power of the first heat source is maintained, more vaporous coolant is released. This would result in improved refrigeration capacity.

At the same time a second intermediate cooler 32 may be present that is arranged between the condenser 24 and the evaporator 28 in order to cool a flow of liquid coolant while emitting heat to a flow of vaporous coolant that flows between the evaporator 28 and the steam inlet 8 of the absorber tank 2. Consequently the pre-cooled coolant comprises fewer gaseous components, and a two-phase flow may largely be prevented. However, this also results in more heat being able to be produced for the evaporator 28 so that the achievable cooling capacity is increased.

Figure 3:
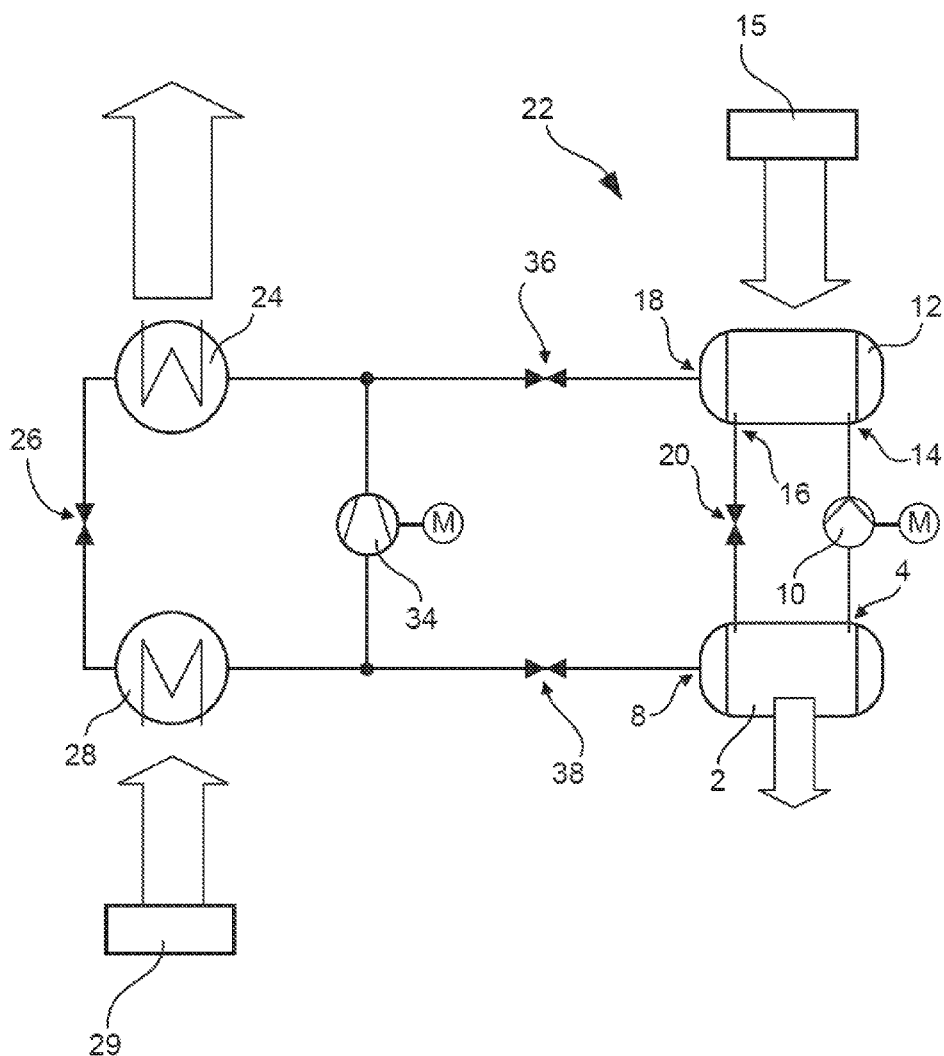
FIG. 3 shows a diagrammatic view of a cooling system of a third exemplary embodiment with a compressor for increasing the cooling capacity.

FIG. 3 shows a further modification of the cooling system of FIG. 1. An additional compressor 34 is proposed, which may be operated as required, which connects the high-pressure part of the coolant circuit with the low-pressure part at a greater increase in pressure. In this manner the provided refrigeration capacity may be further improved in that the compressor is driven as required. This variant is particularly suitable to greatly increase the cooling capacity for a short time if there is temporarily a strong requirement for cooling capacity, without there being a need to permanently operate a cooling system designed for the maximum cooling capacity.

In addition to the above, a first control valve 36 and a second control valve 38 are shown, which are arranged in the high-pressure part and in the low-pressure part respectively. The control valves 36 and 38 may be considered to be particularly advantageous in controlling the flow of coolant. Thus on the one hand it is possible to prevent absorbent from being siphoned from the absorber tank 2 and coolant from reaching the regenerator tank 12 by way of the steam outlet 18. On the other hand it is possible to ensure that only almost pure coolant is pumped in the circuit. In principle, synchronous operation with a thermal compressor and an additional electrical compressor may take place by means of a corresponding setting of the control valves 36 and 38.

Figure 4:
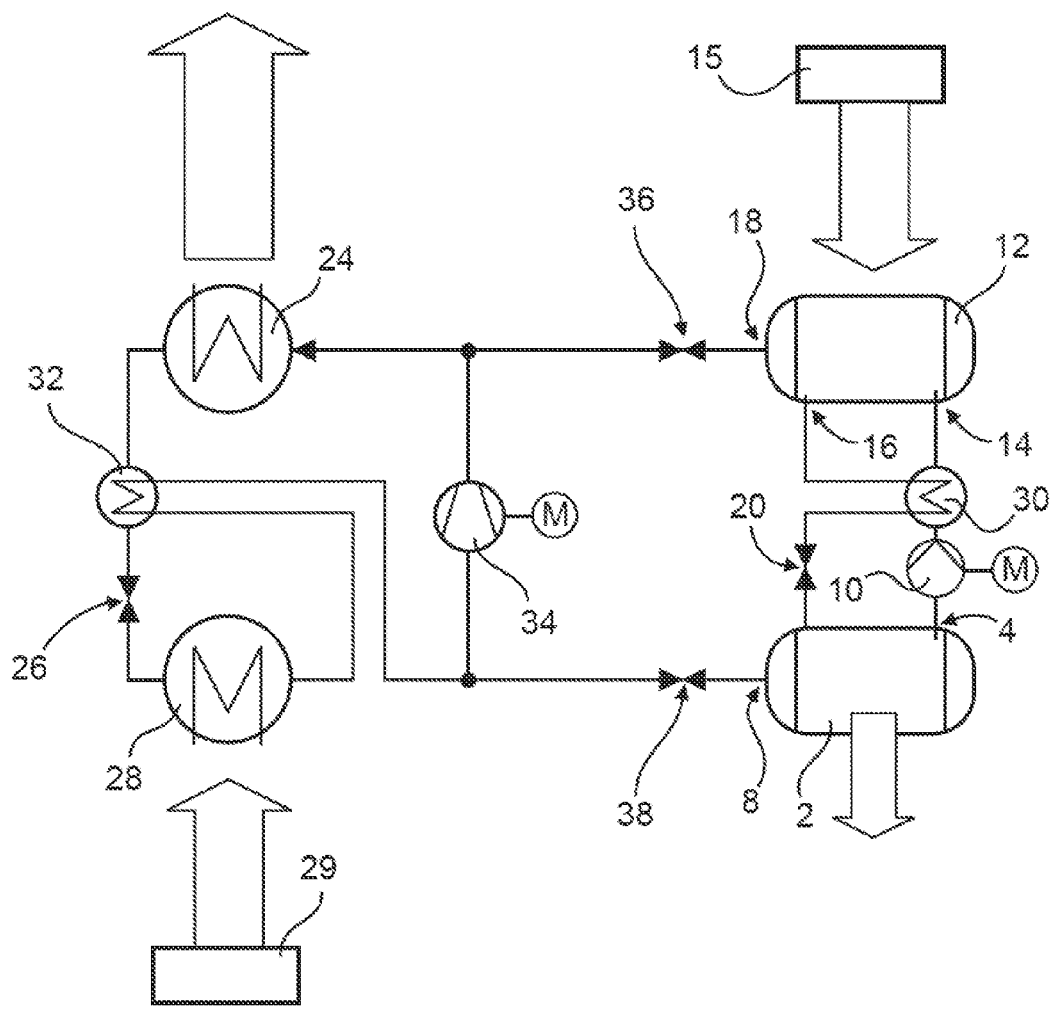
FIG. 4 shows a combination of the exemplary embodiments of FIGS. 2 and 3.

FIG. 4 shows a combination of the exemplary embodiments of FIGS. 2 and 3. The cooling system thus comprises a first intermediate cooler 30, a second intermediate cooler 32 and an additional compressor 34 that may be operated as required. In this manner particularly efficient implementation of a cooling system according to the invention is achieved, with the available refrigeration capacity being very high.

Figure 5:
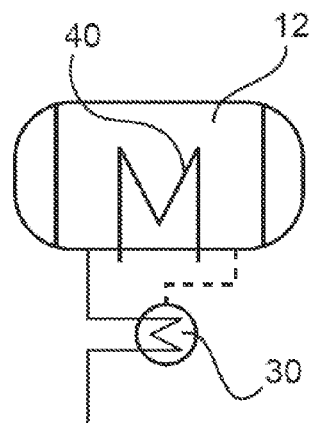
FIG. 5 shows an exemplary illustration of a detail with a supplementary heater.

FIG. 5 shows a detail of the absorbent circuit 22 in which in the regenerator tank 12 a supplementary heater 40 is arranged. The latter makes it possible to relatively easily introduce additional thermal output into the regenerator tank 12. This can, in particular, be advantageous in those cases where the cooling system regularly needs to temporarily provide higher refrigeration capacity than is the case during normal operation. By operating the supplementary heater 40 it is possible to accelerate desorption.

The supplementary heater 40 may be designed as an electrical supplementary heater, or as an alternative as a combustion heating device. An electrical supplementary heater may be installed and operated especially easily, while a combustion heating device provides a particularly high power density. Usually, in a vehicle, fuel is available anyway that may be utilized to operate a combustion heating device.

Figure 6:
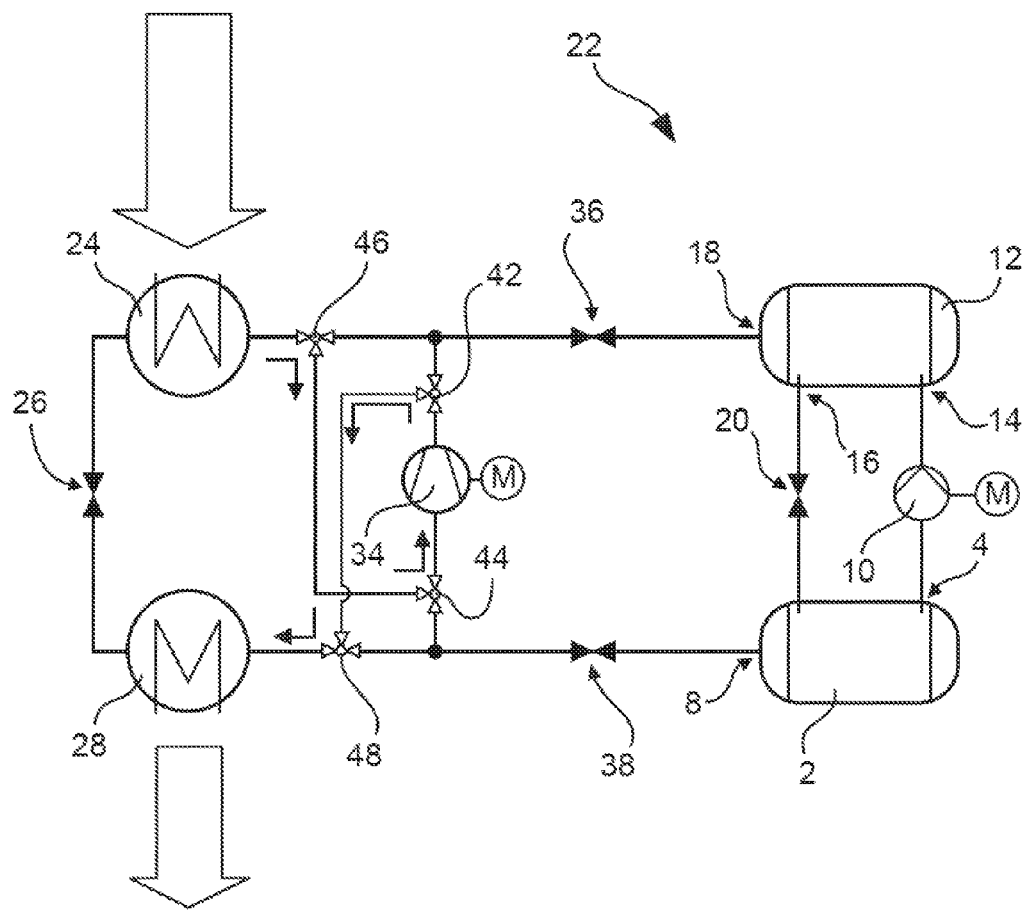
FIG. 6 shows a possible design for reversing the refrigeration circuit.

FIG. 6 shows a slight modification of the cooling system of FIG. 3, in which the additional compressor 34 at its outlet comprises a first switchover valve 42, and at its inlet comprises a second switchover valve 44. Between the compressor 34 and the condenser 24 a third switching valve 46 is provided, and between the evaporator 28 and the compressor 34 a fourth switching valve 48. This arrangement of switching valves 42-48 may be interconnected in such a manner that the compressor 34 conveys coolant exclusively to the evaporator 28, which coolant from that location flows back to the compressor 34 exclusively by way of the condenser 24. In the course of flowing to the condenser 24 the coolant passes through the second pressure reduction means 26 so that the coolant is relaxed. When it has reached the condenser 24, evaporation takes place while absorbing heat. The heat subsequently emitted by the evaporator 28 exceeds the heat introduced to the condenser 24, and consequently in this operating mode the cooling system may be operated as a heat pump, for example in order to achieve rapid heating of the vehicle in a very cold environment. In this process, the condenser 24 and the evaporator 28 practically swap their function.

Figure 7:
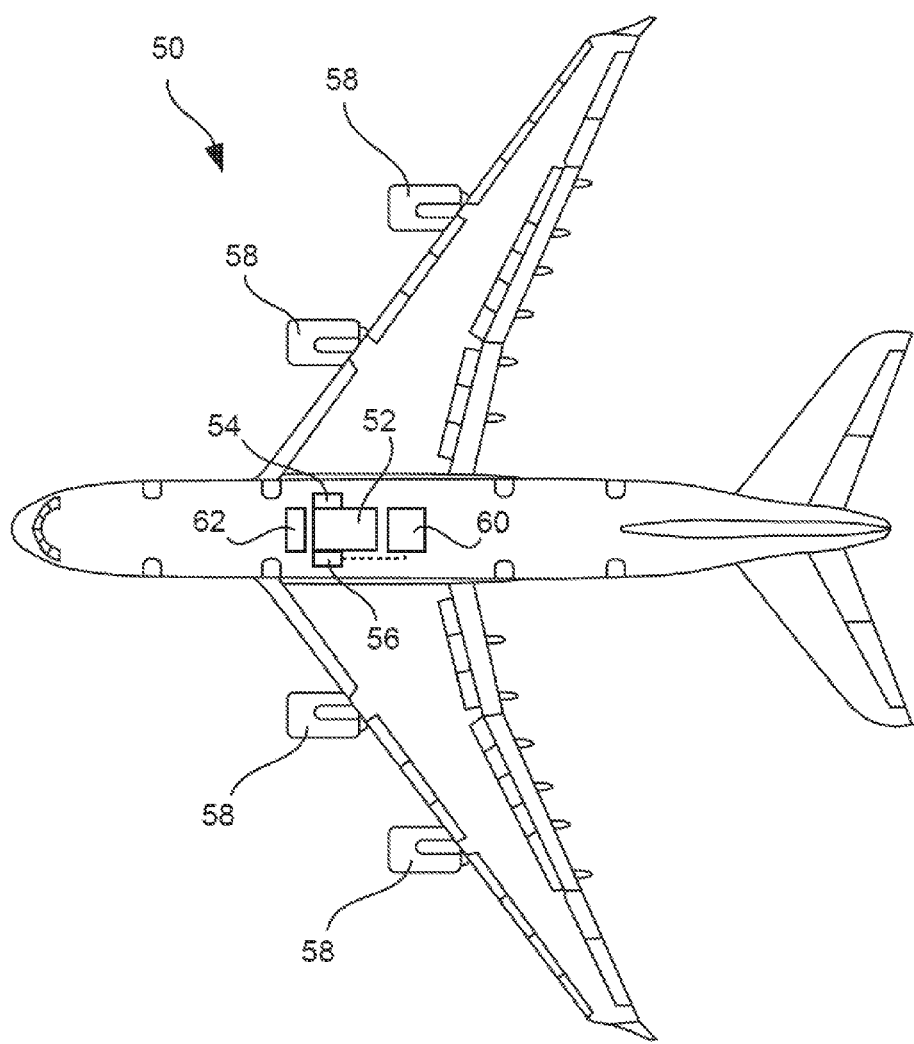
FIG. 7 shows an aircraft comprising a cooling system arranged therein.

Lastly, FIG. 7 shows an aircraft 50 with a cooling system 52 arranged therein to which a first heat source 54 and a second heat source 56 are connected. Because of the interaction, presented above, of the cooling system 52 it is not necessary for engines 58 of the aircraft 50 to have to supply bleed air for operation of a pneumatic air conditioning system if one of the first heat source 54 and of the second heat source 56 is designed as an air cooling device for an air conditioning system 60. Instead, by introducing the waste heat of a waste-heat-emitting device, for example a fuel cell 62, operation of the cooling system and thus of the air conditioning system 60 is made possible. For example the first heat source 54 can be designed as a heat exchanger for emitting heat of the fuel cell 62 which in the aircraft provides electrical power and water, wherein heat is continuously emitted. The second heat source can be implemented by a heat exchanger for a cooling device of the air conditioning system 60. Of course, this splitting up can also be the other way round, and other heat-emitting devices can also be used.

Of course, the illustration in FIG. 7 shows only one example of several possible vehicles that can use such a cooling system. Apart from aircraft, the following can also be considered: motor vehicles, ships and boats, rail-bound vehicles and spacecraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A vehicle comprising a heat emitting device and a cooling system, with the cooling system comprising:
  an absorbent circuit, wherein a liquid absorbent is configured to circulate, the absorbent circuit comprising:
    an absorber tank;
    a regenerator tank;
    an absorbent pump; and
    a first pressure reduction means,
    wherein the absorber tank is connected by an absorber tank outlet, by way of the absorbent pump, to a regenerator tank inlet; and
    wherein a regenerator tank outlet is connected by the first pressure reduction means to an absorber tank inlet; and a coolant circuit, wherein a coolant is configured to circulate, the coolant circuit comprising:
a condenser connected to a steam outlet of the regenerator tank;
a second pressure reduction means; and
an evaporator connected to a steam inlet of the absorber tank and by way of the second pressure reduction means is connected to the condenser;
wherein the regenerator tank is configured to desorb the coolant in solution in the absorbent by absorbing a first quantity of heat provided by a first heat source and to introduce the coolant in a vaporous state into the condenser;
wherein the evaporator is configured to evaporate the coolant while absorbing a second quantity of heat provided by a second heat source and to introduce the coolant in the vaporous state into the absorber tank; and
wherein the first heat source comprises a fuel cell and the second heat source comprises the heat emitting device.

2. The vehicle of claim 1, wherein the first quantity of heat and the second quantity of heat are provided jointly by the first heat source or the second heat source.

3. The vehicle of claim 1, wherein the absorbent comprises water, and the coolant comprises a liquid coolant with a boiling point that is below the boiling point of water.

4. The vehicle of claim 1, wherein the first quantity of heat or the second quantity of heat is providable by the fuel cell.

5. The vehicle of claim 1, further comprising an air cooling device comprising the heat-emitting device, wherein the first quantity of heat or the second quantity of heat is provided by the heat-emitting device.

6. The vehicle of claim 1, further comprising a first intermediate cooler arranged between the regenerator tank outlet and the absorber tank inlet and configured to cool the absorbent flowing out of the regenerator tank by heat emission to the absorbent flowing from the absorber tank to the regenerator tank.

7. The vehicle of claim 1, further comprising a second intermediate cooler arranged between the condenser and the second pressure reduction means and configured to cool the coolant flowing out of the condenser by heat emission to the coolant flowing from the evaporator into the absorber tank.

8. The vehicle of claim 1, further comprising a compressor in fluidic connection with an evaporator outlet and a condenser inlet.

9. The vehicle of claim 1, further comprising a supplementary heater in the regenerator tank.

10. A vehicle comprising a heat emitting device and a cooling system, with the cooling system comprising:
an absorbent circuit, wherein a liquid absorbent is configured to circulate, the absorbent circuit comprising:
an absorber tank;
a regenerator tank;
an absorbent pump; and
a first pressure reduction means,
wherein the absorber tank is connected by an absorber tank outlet, by way of the absorbent pump, to a regenerator tank inlet; and
wherein a regenerator tank outlet is connected by the first pressure reduction means to an absorber tank inlet; and
a coolant circuit, wherein a coolant is configured to circulate, the coolant circuit comprising:
a condenser connected to a steam outlet of the regenerator tank;
a second pressure reduction means; and
an evaporator connected to a steam inlet of the absorber tank and by way of the second pressure reduction means is connected to the condenser;
wherein the regenerator tank is configured to desorb the coolant in solution in the absorbent by absorbing a first quantity of heat and to introduce it in a vaporous state into the condenser;
wherein the evaporator is configured to evaporate the coolant while absorbing a second quantity of heat and to introduce it in the vaporous state into the absorber tank;
wherein at least one of the first and the second quantity of heat is emittable by the heat emitting device,
the vehicle further comprising:
a first control valve arranged between the steam outlet of the regenerator tank and the condenser inlet, and
a compressor arranged to connect a high-pressure part of the coolant circuit with a low-pressure part of the coolant circuit.

11. The vehicle of claim 10, further comprising a second control valve arranged between the evaporator outlet and the steam inlet of the absorber tank.

12. A method for cooling in a vehicle comprising a waste-heat-emitting device, the method comprising:
absorbing a vaporous coolant by a liquid absorbent while emitting heat in an absorber tank,
desorbing a vaporous coolant from the absorbent while absorbing a first quantity of heat provided by a first heat source in a regenerator tank,
condensing the vaporous coolant while emitting heat,
throttling the flow of liquid coolant, and
evaporating the liquid coolant while absorbing a second quantity of heat provided by a second heat source,
wherein the first heat source comprises a fuel cell and the second heat source comprises the waste-heat-emitting device, and
wherein at least one of the first quantity of heat and of the second quantity of heat is provided by the heat-emitting device.

13. The method of claim 12, further comprising cooling the absorbent flowing from the regenerator tank to the absorber tank by heat emission by a first intermediate cooler to the absorbent flow from the absorber tank to the regenerator tank.

14. The method of claim 12, further comprising cooling the liquid coolant flow flowing from a condenser to the evaporator by heat emission by a second intermediate cooler to the coolant flow flowing from the evaporator to the absorber tank.

\* \* \* \* \*